United States Patent
Albert et al.

(10) Patent No.: US 6,504,642 B1
(45) Date of Patent: Jan. 7, 2003

(54) BIREFRINGENT OPTICAL DEVICE

(75) Inventors: Richard Albert, Santa Rosa, CA (US);
Arne Erstling, Santa Rosa, CA (US);
Desmond L. Seekola, Santa Rosa, CA (US); Brent Bergner, Charlotte, NC (US); Michael Knotz, Sebastopol, CA (US)

(73) Assignee: Spectraswitch, Inc., Santa Rosa, CA (US)

( * ) Notice: Subject to any disclaimer, the term of this patent is extended or adjusted under 35 U.S.C. 154(b) by 0 days.

(21) Appl. No.: 09/663,103

(22) Filed: Sep. 15, 2000

Related U.S. Application Data

(60) Provisional application No. 60/154,175, filed on Sep. 15, 1999.

(51) Int. Cl.[7] .......................... G02F 1/07; G02F 1/1335; G02F 1/29; G02B 6/42
(52) U.S. Cl. .......................... 359/256; 385/16; 349/117; 349/119; 359/301
(58) Field of Search .............................. 349/18, 72, 117, 349/119, 121, 172; 359/239, 246, 249, 253, 256, 281, 301; 385/16

(56) References Cited

U.S. PATENT DOCUMENTS

| | | | |
|---|---|---|---|
| 4,679,894 A | 7/1987 | Pavlath | 385/41 |
| 4,711,529 A | 12/1987 | Baker | 349/196 |
| 4,720,171 A | 1/1988 | Baker | 349/196 |
| 4,720,172 A | 1/1988 | Baker | 349/196 |
| 4,720,174 A | 1/1988 | Baker | 349/196 |
| 4,737,019 A | 4/1988 | Baker | 349/196 |
| 4,749,258 A | 6/1988 | Baker | 349/196 |
| 4,755,038 A | 7/1988 | Baker | 349/196 |
| 4,773,736 A | 9/1988 | Baker | 349/196 |
| 4,781,426 A | 11/1988 | Baker | 385/33 |
| 4,784,470 A | 11/1988 | Baker | 349/197 |

(List continued on next page.)

FOREIGN PATENT DOCUMENTS

| | | | |
|---|---|---|---|
| EP | 94309339.3 | 12/1994 | |
| EP | 0663604 A1 | * 7/1995 | ........... G02B/27/28 |
| WO | WO 99/04311 | 1/1999 | |
| WO | WO 99/08403 | 2/1999 | |
| WO | WO 99/28778 | 6/1999 | |
| WO | WO 99/49605 | 9/1999 | |
| WO | WO 99/45738 | 10/1999 | |
| WO | WO 99/55024 | 10/1999 | |
| WO | WO 99/35518 | 7/2000 | |

OTHER PUBLICATIONS

Kazuhiro Noguchi: "Optical Free–Space Multichannel Switches Composed of Liquid–Crystal Light–Modulator Arrays and Birefringent Crystals" Journal of Lightwave Technology (1998).

Shin–Tson Wu: "Double parallel–aligned cells for high speed liquid crystal displays"; Hughes Research Laboratories (1992).

Shin–Tson Wu et al. "Mylar–film–compensated π and parallel–aligned liquid crystal cells for direct–view and projection displays" Hughes Research Laboratories (1994).

Shin–Tson Wu "Film–compensated homeotropic liquid–crystal cell for direct view display" Hughes Research Lab's. (1994).

*Primary Examiner*—Georgia Epps
*Assistant Examiner*—David N. Spector
(74) *Attorney, Agent, or Firm*—Gray Cary Ware & Freidenrich LLP

(57) ABSTRACT

A polarization independent optical device is provided wherein the device has two optical paths that include one or more birefringent crystals, a electrically controllable rotator, and a fixed waveplate. The device may operate as a switch, attenuator, coupler, or polarization mode dispersion compensator. The device may also include several folded path embodiments, a multifunctional embodiment, and a temperature insensitive embodiment.

15 Claims, 11 Drawing Sheets

U.S. PATENT DOCUMENTS

| | | | |
|---|---|---|---|
| 4,790,633 A | 12/1988 | Baker | 349/197 |
| 4,792,212 A | 12/1988 | Baker | 349/197 |
| 4,813,769 A | 3/1989 | Baker | 349/197 |
| 4,884,876 A | 12/1989 | Lipton et al. | 349/33 |
| 4,913,509 A | 4/1990 | Baker | 385/16 |
| 4,969,717 A | 11/1990 | Mallinson | 349/196 |
| 5,013,140 A * | 5/1991 | Healey et al. | 349/196 |
| 5,414,541 A | 5/1995 | Patel et al. | 349/196 |
| 5,469,279 A | 11/1995 | Sharp et al. | 359/53 |
| 5,568,286 A | 10/1996 | Riza | 349/74 |
| 5,710,846 A | 1/1998 | Wayman et al. | 385/17 |
| 5,724,165 A * | 3/1998 | Wu | 359/117 |
| 5,727,109 A | 3/1998 | Pan et al. | 385/140 |
| 5,734,763 A | 3/1998 | Chang | 385/11 |
| 5,859,728 A * | 1/1999 | Colin et al. | 359/561 |
| 5,867,291 A | 2/1999 | Wu et al. | 359/124 |
| 5,870,159 A | 2/1999 | Sharp | 349/121 |
| 5,912,748 A | 6/1999 | Wu et al. | 359/117 |
| 5,912,766 A | 6/1999 | Pattie | 359/484 |
| 5,946,116 A | 8/1999 | Wu et al. | 359/117 |
| 5,963,291 A | 10/1999 | Wu et al. | 359/124 |
| 5,978,116 A | 11/1999 | Wu et al. | 359/124 |
| 5,999,240 A | 12/1999 | Sharp et al. | 349/119 |
| 6,075,512 A * | 6/2000 | Patel et al. | 345/101 |
| 6,097,518 A | 8/2000 | Wu et al. | 359/128 |
| 6,124,872 A * | 9/2000 | Matsubara et al. | 347/133 |
| 6,141,071 A | 10/2000 | Sharp | 349/121 |
| 6,226,115 B1 | 5/2001 | Shirasaki et al. | 359/280 |
| 6,288,807 B1 | 9/2001 | Wu et al. | 359/122 |

* cited by examiner

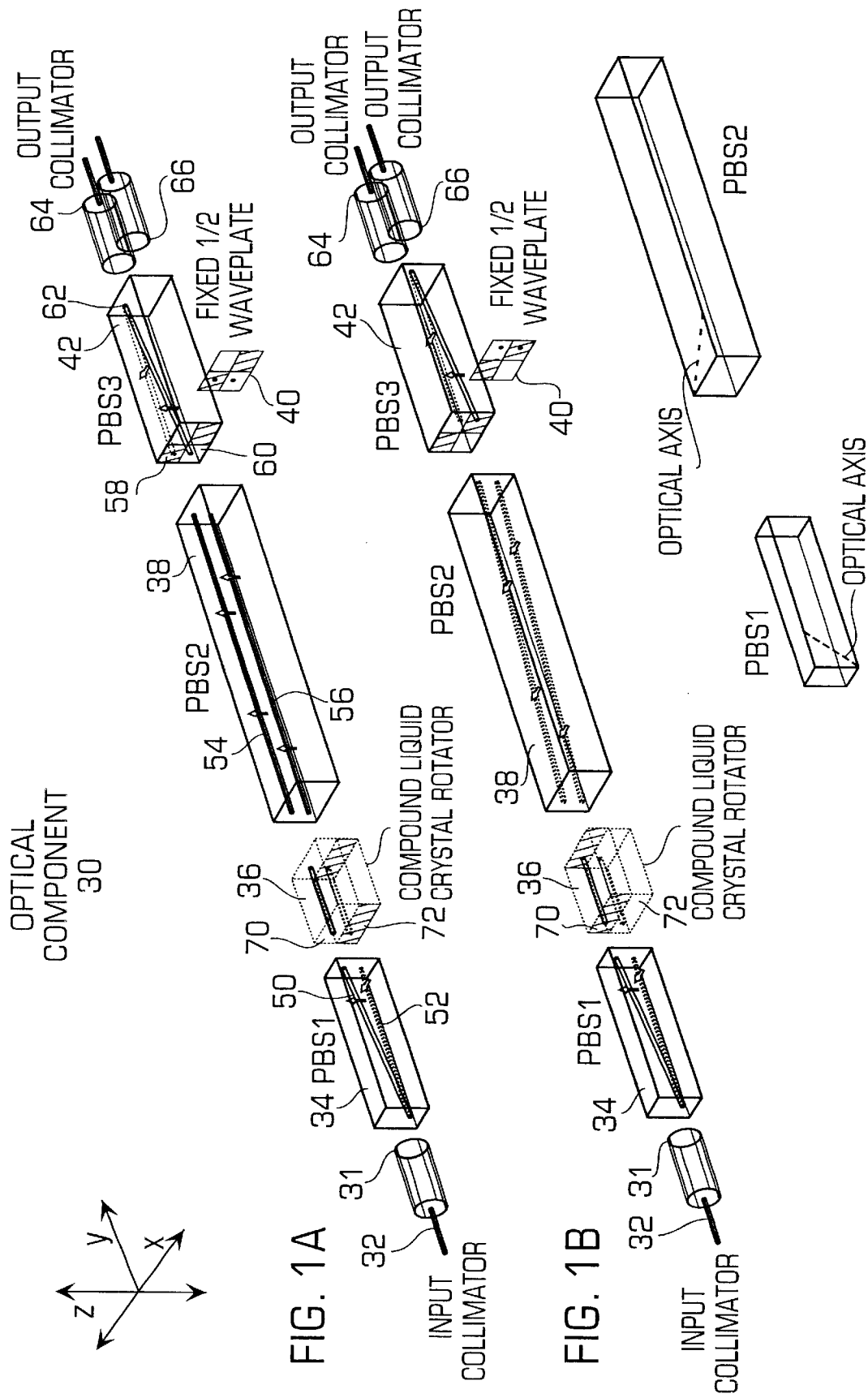

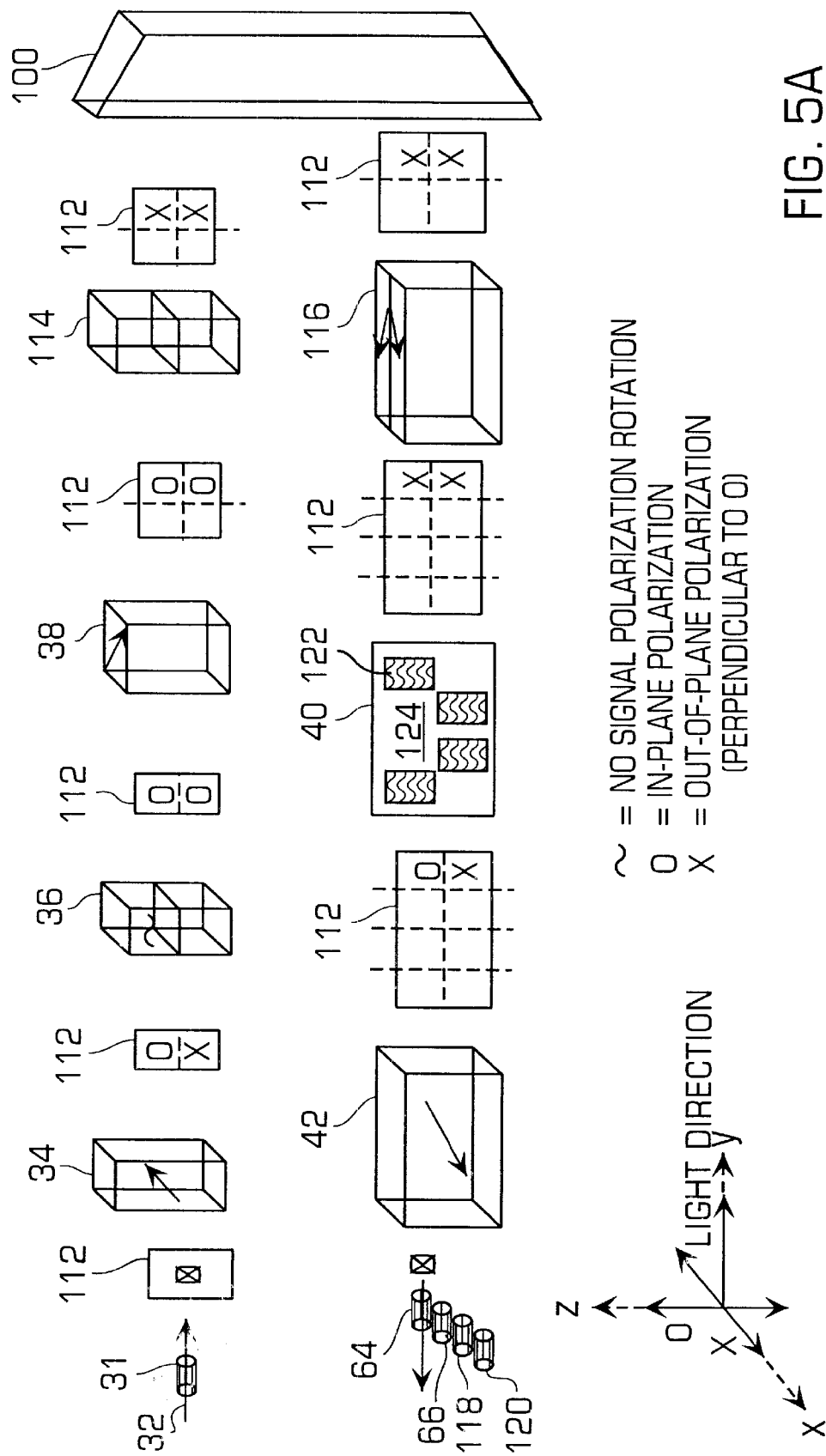

~ = NO SIGNAL POLARIZATION ROTATION
O = IN-PLANE POLARIZATION
X = OUT-OF-PLANE POLARIZATION
    (PERPENDICULAR TO O)

FIG. 10: Sample Voltage vs. Temperature Compensation for Active Pixels

| TEMP °C | PORT 2 PIXEL 3 V | PORT 2 PIXEL 6 V | PORT 1 PIXEL 3 V | PORT 1 PIXEL 6 V |
|---|---|---|---|---|
| 0.8 | 5.162 | 12.444 | 12.582 | 5.277 |
| 10.9 | 5.346 | 12.329 | 12.467 | 5.461 |
| 20.8 | 5.623 | 12.213 | 12.19 | 5.738 |
| 30.8 | 6.014 | 12.052 | 11.845 | 6.153 |
| 40.8 | 6.683 | 11.868 | 11.545 | 6.913 |
| 50.9 | 8.434 | 11.775 | 11.407 | 9.102 |

FIG. 11: Sample Drive Voltages for Passive Pixels

| PORT 1 PIXEL 1 V | PORT 1 PIXEL 2 V | PORT 1 PIXEL 4 V | PORT 1 PIXEL 5 V | PORT 2 PIXEL1 V | PORT 2 PIXEL 2 V | PORT 2 PIXEL 4 V | PORT 2 PIXEL 5 V |
|---|---|---|---|---|---|---|---|
| 1 | 1 | 23 | 23 | 23 | 23 | 1 | 1 |

BIREFRINGENT OPTICAL DEVICE

RELATED APPLICATION

This application claims priority from U.S. provisional patent application No. 60/154,175, filed Sep. 15, 1999, and entitled "Polarization Independent Birefringent Optical Device," which is incorporated herein by reference and is owned by the same assignee as the present invention.

BACKGROUND OF THE INVENTION

This invention relates generally to an optical device for controlling a light beam and in particular to an electrically controlled optical device that changes the path or intensity of a light beam.

Fiber optic communication network infrastructures are becoming more diverse and sophisticated. The demand for greater bandwidth has added complexity to their architecture. In these all-optical networks, channels are dynamically routed, switched, provisioned, restored, and protected in the optical layer. Switches and attenuators are critical elements in these architectures, and in support of these components, various technologies exist or are under development.

To date, numerous types of optical switches have been proposed or commercially made. Although the performance properties of these technologies are often very strong in one area, they tend to be deficient in others. For example, an electro-optical switch proposed by Soref suffers from huge insertion losses. In this switch, the incident beam is split by a birefringent crystal into two orthogonal polarizations. Only one of the polarizations is optically routed through the switch; the other portion of the incident light is lost. Optical switching technology based on lithium niobate crystals is extremely fast, but has high crosstalk and high insertion losses. Optomechanical devices, currently the most widely used switching components, have some very good switching characteristics, but are highly unreliable due to their moving parts.

An optical switch that uses electrically controllable rotators in combination with one or more birefringent crystals to route an optical signal is shown in U.S. Pat. No. 5,724,165. In a preferred embodiment, the rotators are electrically controllable liquid crystal elements. This patent uses two electrically controllable rotator elements in a 1×2 switch. The use of two electrically controllable rotator elements is inefficient and requires a more complex controller, making manufacturability difficult, increasing materials cost, and duplicating any electro-optical functional deficiency associated with the one electrical controller. Our invention simplifies the design by using only one electrically controllable electrical rotator and thus eliminates some of the aforementioned problems. It also incorporates other elements to overcome other deficiencies associated with the other technologies mentioned above.

SUMMARY OF THE INVENTION

In contrast to prior art, we propose an optical component with excellent switching properties, including low crosstalk, low insertion loss, low polarization loss, relatively fast dynamic response, relatively low switching voltage, good temperature stability, and high reliability. The optical component in accordance with the invention is also multifunctional, as opposed to typical single-function switches, attenuators, variable couplers, and polarization mode dispersion compensators. In particular, the optical component may operate in one or more different modes of operation wherein the particular mode of operation is determined by firmware without changing the optical hardware. In more detail, a microprocessor-based hybrid liquid crystal optical component is provided wherein the voltages applied to the liquid crystal rotator are varied in order to change the functionality of the optical component. For example, depending on the applied voltage, the functionality can be changed from a switch to an attenuator.

The optical component in accordance with the invention may include a set of fixed waveplate rotators located between the second and third birefringent crystals, which simplifies the control of the optical component. The optical component may also include a liquid crystal multicell rotator element that permits the optical component to be operated in one or more different modes. In addition, the optical component in accordance with the invention may also include a temperature control mechanism so that the optical component is not sensitive to temperature changes.

The present invention is thus a birefringent optical device that can employ a compound, zero-order, field-driven liquid crystal rotator in order to provide input-signal polarization independence. The invention provides an optical device that may include one or more variable-retardation, birefringent rotators, and one or more birefringent elements, such as crystals. Each rotator is a single retardation cell or a composite of two or more retardation cells with at least one compensator cell. The polarization-rotating properties of these rotators enable the optical device accordance with the invention to be independent of the incident polarization. These rotators are broadband, with high contrast ratio, relatively low insertion loss, and fast response time, resulting in an optical device that likewise has low crosstalk, low insertion loss, and fast response time relative to typical optical devices. The optical device may include birefringent beamsplitters alternating with active and passive rotation elements that guide the light signal. The birefringent beamsplitter separates an input signal into an ordinary ray (an s-polarization ray) and an extraordinary ray (a p-polarization ray). The ordinary ray travels in a forward direction, while the extraordinary ray travels forward and upward, or forward and sideways, depending on the orientation of the optical axis of the birefringent element. Both rays then pass through a rotator having dual rotating elements. Each rotating element may independently and controllably rotate the polarization of the particular incident beam. The rotating elements are a combination of field-addressed, near-zero-order, birefringent liquid crystal rotator cells and retardation waveplates.

In more detail, the optical device in accordance with the invention may include a means to generate and separate light into two orthogonal, linearly polarized beams. The optical device in accordance with the invention may further include the means to recombine the separated beams into a single beam or to keep both beams separated. Thus, the optical device includes the means for directing light very rapidly from one input port to any number of exit ports. The present invention also further minimizes the polarization dependence of the device by adjusting the voltages of the liquid crystal cells in the cell stack of the compound rotator at the appropriate input incident light polarization.

The present invention also solves the various deficiencies of typical optical switches and components with zero-order rotators by using an electrically variable retardation device. in articular an electrically tunable birefringent liquid crystal cell is used as the retarder to achieve close to zero-order retardation.

In accordance with the invention, an optical device is provided that comprises a birefringent element for separating incoming light into first and second signals having different polarizations, and an electrically controlled rotator element for independently rotating the polarization of the first and second polarization signals to generate third and fourth signals having polarizations similar to each other. The rotator element further comprises a stack of one or more rotator elements and a compensator element to provide low crosstalk and fast switching speed.

In accordance with another aspect of the invention, a polarization independent optical device is provided. The optical device comprises a first birefringent element for separating incoming light into first and second polarization signals and an electrically controlled rotator element for independently rotating the polarization of the first and second polarization signals to generate third and fourth signals having polarizations similar to each other, wherein the rotator element comprises a stack of one -or more rotator elements and a compensator element. The optical device further comprises a second birefringent element for directing the third and fourth signals in predetermined directions based on the polarization of those signals to generate fifth and sixth signals, fixed waveplates for rotating the fifth or sixth signals wherein only one of the signals is rotated at any time based upon the position of the waveplates which is related to the choice of the optical axis in the third birefringent element. The output of the fixed waveplates are different polarizations and a third birefringent element for combining the seventh and eighth signals and directing the signals to one or a plurality of output ports.

In accordance with yet another aspect of the invention, a method for directing an optical signal from an input port to one of a plurality of output ports is provided. The method comprises splitting the optical signal into first and second signals having different polarizations, independently rotating the polarization of the first and second signals to generate third and fourth signals having polarizations similar to each other, wherein the independent rotating further comprises passing the first and second signals through a stack of one or more rotator elements and a compensator element. The method further comprises directing the third and fourth signals in a predetermined direction based on the polarization of those signals to generate fifth and sixth signals, rotating the fifth and sixth signals to generate seventh and eight signals having different polarizations, combining the seventh and eight signals, and directing the signals to one or a plurality of output ports.

In accordance with another aspect of the invention, a multifunctional optical component having one or more light paths through one or more optical components is provided. The optical component includes a rotator that changes the polarization of the light traveling through the one or more light paths and a variable-voltage signal source for generating a drive signal to control the rotator. A memory stores one or more different sets of drive signal characteristics wherein each different set of drive signal characteristics changes the operation of the rotator. A controller controls the operation of the optical component by selecting a set of drive signal characteristics to control the rotator such that the optical component has a different function depending on the set of drive signal characteristics selected by the controller.

In accordance with yet another aspect of the invention, a temperature insensitive optical component having one or more light paths through one or more optical components is provided. The optical component comprises a rotator that changes the polarization of the light traveling through the one or more light paths and a variable-voltage signal source for generating a drive signal to control the rotator. A memory stores one or more different sets of drive signal characteristics wherein each different set of drive signal characteristics changes the operation of the rotator and a temperature sensor determines the operating temperature of the optical component. A microcontroller controls the operation of the optical component by selecting a set of drive signal characteristics, based on the temperature sensor, to control the rotator, wherein the selected set of drive signal characteristics causes the optical component to operate in a predetermined manner at the particular operating temperature.

In accordance with yet another aspect of the invention, a temperature insensitive multifunctional optical component having one or more light paths through one or more optical components is provided. The optical component comprises a rotator that changes the polarization of the light traveling through the one or more light paths and a variable-voltage signal source for generating a drive signal to control the rotator. A memory stores one or more different sets of drive signal characteristics wherein each different set of drive signal characteristics changes the operation of the rotator. A temperature sensor determines the operating temperature of the optical component, and a controller controls the operation of the optical component by selecting a set of drive signal characteristics to control the rotator wherein the selected set of drive signal characteristics causes the optical component to operate in a predetermined manner at the particular operating temperature and perform a particular optical function.

BRIEF DESCRIPTION OF THE DRAWINGS

FIGS. 1a and 1b illustrate a polarization independent optical device in accordance with the invention;

FIGS. 5a–d illustrate the operation of a 1×4 folded-path optical component in accordance with the invention;

FIG. 10 is a diagram illustrating the preferred temperature compensation drive voltages for active pixels in accordance with the invention; and FIG. 11 is a diagram illustrating the drive voltages for passive pixels in accordance with the invention.

DETAILED DESCRIPTION OF A PREFERRED EMBODIMENT

Figure 2A:
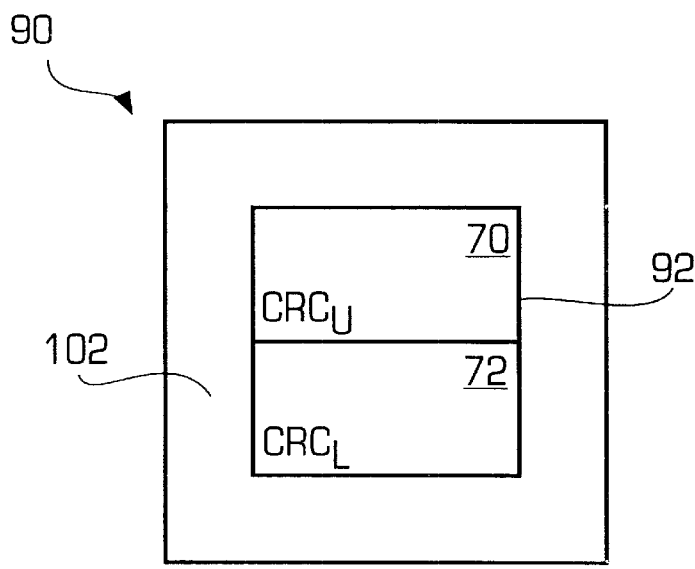
FIGS. 2a–c illustrate a liquid crystal rotator cell.

The invention is particularly applicable to a birefringent optical component/device used as a switch, and it is in this context that the invention will be described. It will be appreciated, however, that the device in accordance with the invention has greater utility because it may also be used for various optical functions such as attenuation, coupling, and polarization mode dispersion compensation. To better understand the invention, the path of the ordinary (s-polarization) and the extraordinary (p-polarization) light signals through the optical device in accordance with the invention and an overview of the optical device will now be described.

The designation of s- and p-orthogonal polarizations is dependent on the optical axis orientation of the birefringent element through which the signal passes. Thus a particular polarization, for example, s-polarization that passes through a first birefringent element would become p-polarization when it passes through a second birefringent element whose optic axis plane is rotated 90° relative to the first birefringent element. Therefore, for future discussion the two orthogonal light polarizations will be referenced to a set of x,y,z axes as denoted in FIGS. 1 and 5. The light direction is along the y axis. The light polarization in the yz plane, the in-plane polarization, will be designated as O polarization, and light polarization which lies in the xz plane orthogonal to O polarization will be designated as the X polarization.

FIG. 1a illustrates a birefringent optical device 30 in accordance with the invention, which is electrically controlled to direct an input optical signal from an input port to a first output port, while FIG. 1b illustrates the same birefringent optical device 30 in accordance with the invention when it is electrically controlled to direct an optical signal from the same input port to a second output port. This optical device may be referred to as a 1×2 optical device. The elements of the optical device 30 will be described first, and then the operation of the device will be briefly described. The optical device 30 may include an input port 31 with a collimator (as is well known) that collimates an incoming optical signal 32. The optical signal may be a single wavelength or may be multiple different wavelengths. The optical signal is typically in the infrared spectrum, but may also be in other electromagnetic spectrums, such as the visible light spectrum.

The incoming/incident optical signal is collimated by the collimator and then enters a first beamsplitter 34 that may preferably be a birefringent element such as a birefringent crystal as described below. The beamsplitter splits the incoming optical signal, based on the polarization components of the incoming optical signal, into two optical signals 50, 52 having different polarizations as described below in more detail. The two optical signals output from the beamsplitter 34 are passed through an electrically controlled rotator 36, as described in more detail below, that independently rotates the polarization of each of the optical signals based on the polarization of the input signal. In accordance with a preferred embodiment of the invention, the rotator 36 may independently rotate the polarization of each signal using first and second independently controllable rotator elements 70, 72 as described in more detail below. When a first voltage is applied to a rotator element (i.e., the rotator element is "on"), the polarization of the signal is not rotated, while when a second different voltage is applied to the rotator element (i.e., the rotator element is "off"), the polarization of the signal is rotated a predetermined amount (e.g., from the X polarization to the O polarization or vice-versa). For an embodiment using nematic-based liquid crystal devices (LCDs), the voltages applied to the cells are AC voltages to prevent electrode and contamination problems. The actual values of the first and second voltages depend on the physical properties of liquid crystal being used and the individual cell configuration properties, such as the thickness of the cell. For example, one liquid crystal with a particular set of parameters is in the "on" state when a higher voltage is applied to the material and is in an "off" state when a lower voltage is applied to the material.

The output of the rotator 36 may be two optical signals 54, 56 that have polarizations similar to each other (as described below in more detail) due to the independent control of the different elements 70, 72 of the rotator 36. The optical signals output from the rotator 36 may be incident on a second beamsplitter 38 that is similar to the first beamsplitter (except that its optical axis has been rotated 90 degrees) and may redirect the incoming signals, depending on the polarization of the incoming signals as described below. The output from the second beamsplitter 38 is directed to a static/fixed waveplate wherein one of the beams passes through the static/fixed waveplate 40. The fixed waveplate (i.e., "fixed" in that it is not electrically controllable) rotates the polarization of one of the optical signals, resulting in two optical signals 58, 60 that have different polarizations. The two output signals 58, 60 may then enter a third beamsplitter 42 (with an optical axis orientation that is the same as the first beamsplitter 34) that recombines the two optical signals 58, 60 to form either an exit optical signal 62 through a first output port 64 having a first output collimator as shown in FIG. 1a or an exit optical signal 62 through a second output port 66 having a second output collimator as shown in FIG. 1b. In accordance with the invention, the optical device in this example may direct an optical signal from one or more input ports to one or more different output ports (an embodiment with a single input and two output ports is shown in FIGS. 1a and 1b) and/or attenuate the optical signals. (A multifunctional optical device in accordance with the invention is described below.) The operation of this embodiment of the optical device 30 in accordance with the invention will now be described in more detail.

In operation, proceeding from entry to exit, an optical signal (also referred to as light hereinafter) travels, in the embodiment of the optical device shown in FIGS. 1a and 1b, along one of two paths (i.e., a first path from the input port to a first output port as shown in FIG. 1a or a second path from the input port to a second output port as shown in FIG. 1b) wherein the O polarization travels along a different route than the X . Although the O and X polarizations travel along separate routes, the optical device in accordance with the invention uses both of the polarization components so that the typical high insertion loss is not present. Although a switching embodiment is shown in FIGS. 1a and 1b, the incoming light may also travel along both paths so that a portion of the light exits the first output port and the rest of the light exits the other output port, so that the device can function as an attentuator or coupler.

For light to travel along the first path, as shown in FIG. 1a, the upper rotator element 70 is on and the lower rotator element 72 is off so that one polarized beam is rotated while the other beam is not rotated. In general, the light is split, recombines, and leaves through collimating lens 64. For light to travel along a second path as shown in FIG. 1b, the upper rotator element 70 is off (as described below) and the lower rotator element 72 is on so that light is split, recombines, and then leaves through collimating lens 66. These two paths correspond to different outputs of a 1×2 optical switch.

In operation, light (having arbitrary polarization) from the first input port 31 enters the first birefringent element 34, such as a birefringent crystal. The first birefringent crystal splits the light into two orthogonal polarizations, the O polarization and an X polarization. In the birefringent element, the O polarization moves through the element and upward at a predetermined angle from the optical axis as is well known. The movement of the O polarization beam upward from the X polarization is known as walkoff. The X polarization passes, colinear to the direction of the incident light, through the first birefringent element so that the O and X polarizations become separated by some distance. Thus, both waves exit the first birefringent crystal 34 parallel to the direction of entry, but the O polarization exits a predetermined distance from the X polarization (i.e., the O polarization walks off from the X polarization). Between the first birefringent element 34 and the second birefringent element 38 is the rotator 36 that may include two liquid crystal rotator elements 70, 72. The upper and lower rotator elements 70, 72 work in opposition: when one rotator element is rotating the polarization of the incoming signal, the other rotator element is not rotating the polarization of the signal, or vice-versa. In particular, an "off" liquid crystal rotator element converts a first polarization to a second polarization (e.g., a O polarization into an X polarization or X polarization into O polarization) while an "on" rotator element leaves the polarization unchanged.

The rotator 36 in accordance with the invention may be formed by using a stack or coupling of one or more field-driven liquid crystal retardation cells with one or more liquid crystal compensating cells. In a preferred embodiment, the rotator 36 may comprise 2 to 3 retardation cells and one compensation cell. The optical axes of the field-driven variable retardation cells are parallel to each other, while the compensating cell has its optical axis at 90° to the axes of the retardation cells. The advantages gained by such a compound system of retardation cells and compensation cells are higher crosstalk, faster response time, wider bandwidth, relatively low operating voltage, minimal polarization sensitivity, and little temperature sensitivity as described below. The optical device may be used for various optical functions. The embodiment described above has a switching function in which incoming light is directed either entirely to the first output port or entirely to the second output port. The optical device in accordance with the invention may also operate in an attenuation coupling mode in which the energy of the incoming light may be split between the two output ports so that each output port emits some portion of the incoming light. In the attenuation mode, the percentage of light that exits each output port is controllable. Now, more details of the individual components of the optical device 30 in accordance with the invention will be described.

In preferred embodiment, the collimating lenses may be quarterwave pitch, gradient index lenses tuned to 1550 nm with an output beam deviation relative to the central axis of the lens of <2°. The lenses have an 1.8-mm diameter projecting a 500-$\mu$m diameter beam. In the preferred embodiment, the birefringent beamsplitters (referred to as PBS) may be made of rutile single crystal optimized for 1550 nm with a length between 10 and 20 mm. The ordinary refractive index is 2.452 (1.55 um) and the extraordinary refractive index is 2.709 (1.55 um). The typical insertion loss of a typical 1×2 optical device (optical component 30) without the compound optical rotator is −0.3 dB at 1550 nm. The typical insertion loss for a 1×2 optical device at 1550 nm including the compound rotator is −0.7 dB. Now the beamsplitter will be described in more detail.

The birefringent beamsplitters 34, 38 (with a different optical axis as described above), and 42 have similar operations. In particular, the optical axis of the PBS1 is preferably at an approximate 45° angle to the direction of the incident light and the front face of the birefringent crystal. Upon entering the PBS1, the incident light beam from the collimating lens is divided into an X polarization and an O polarization, the X polarization moves forward, colinear and parallel to the direction of the incident light, while the O polarization walks off at an angle, r, to the X polarization direction. In a preferred embodiment, the walkoff angle, r, is approximately 5.68° at 1550 nm, with the optical axis at an angle, $\psi$, of about 45° to the front face of the birefringent element PBS1 as shown in FIG. 1. Now, the rotator and the rotator elements are described in more detail.

Figure 2B:
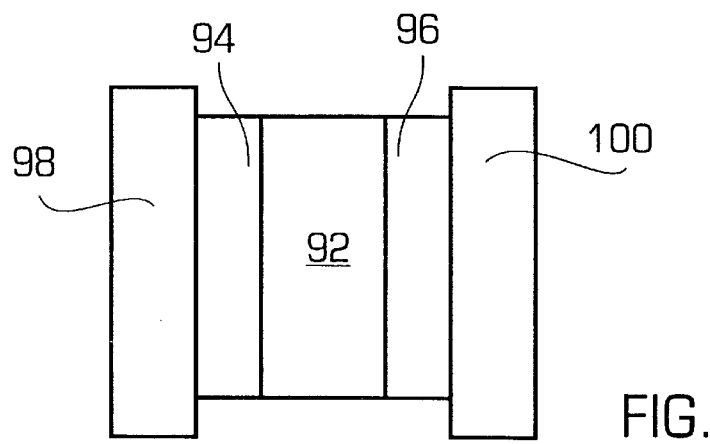
Figure 2C:
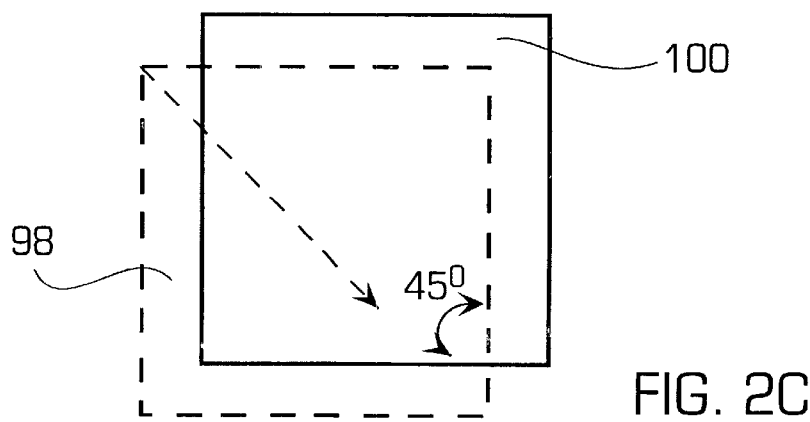

FIGS. 2a–c, 3a, and 3b, illustrate more details of the rotator 36 and its independently controllable rotator elements 70, 72 in accordance with the invention. In particular, FIGS. 2a–c illustrate a single rotator cell 90 that makes up a portion of the rotator 36. The cell 90 may include a liquid crystal film layer 92 sandwiched between a first and second aligning layer 94, 96 and a first and second electrode 98, 100. The electrodes may be formed with well-known indium titanium oxide (ITO), which is transparent, but may conduct an electric field to the cell in order to control the operation of the cell. The electrodes may be patterned. As shown in FIG. 2a, the liquid crystal material 92 may be surrounded by a glue seal 102 that prevents external contamination and leakage. Preferably, the liquid crystal material may be nematic liquid crystal material.

As shown in FIG. 2c, the surface alignment layer of each side of the cell may be rubbed, as is well known. In a preferred embodiment, one side of the cell is rubbed at a 45 angle as shown in FIG. 2c and the other side is rubbed in the antiparallel direction to form an ECB cell. Although an ECB cell with antiparallel rubs is shown, a Pi-cell may also be used wherein the two sides of the cell are rubbed in parallel directions.

In accordance with the invention, the cell 90 may be a segmented liquid crystal cell wherein the first rotator element 70 and second rotator element 72 are formed as shown in FIG. 2a so that each element 70, 72 may be independently controlled using a separate driving voltage. Therefore, the signals passing through the first and second light paths, as described above, are independently rotatable. In a preferred embodiment, the two rotator elements 70, 72 operate in opposite modes so that when one element is off, the other element is on, and vice-versa, so that one of the signals passing through the rotator has its polarization rotated while the other signal passes through the rotator unchanged. Each rotator element 70, 72 acts as a tunable half-wave plate that rotates the polarization of the light passing through it.

In accordance with the invention, the rotator 36 may include one or more of the above cells stacked together, wherein each cell is independently controllable with its own control voltage. For a certain operating voltage at a given wavelength and liquid crystal birefringence, a rotator cell of predetermined thickness is normally required to rotate the polarization of light by 90° or 0°. However, a sufficiently thick liquid crystal rotator cell takes too long to switch between states (approximately 14 ms at 1550 nm at room temperature for a conventional liquid crystal material) and is therefore too slow for the rapid switching necessary for modem optical networks. In accordance with the invention, however, one or more thin cells may be combined in a predetermined way to achieve rapid switching times (e.g., on the order of 5 ms at 1550 nm) may be combined together. In accordance with the invention, since each cell may be independently controlled and switched, the cells may be simultaneously switched to achieve a faster switching time than the thicker single cell yet still achieve the goal of providing the polarization rotation provided by a thicker cell since the light passes through all of the cells in the stack. The number and optical axis arrangement of the cells is predetermined and affects the closeness to a 90° or 0° polarization rotation within a certain operating voltage, which in turn affects the crosstalk value of the device.

Figure 3A:
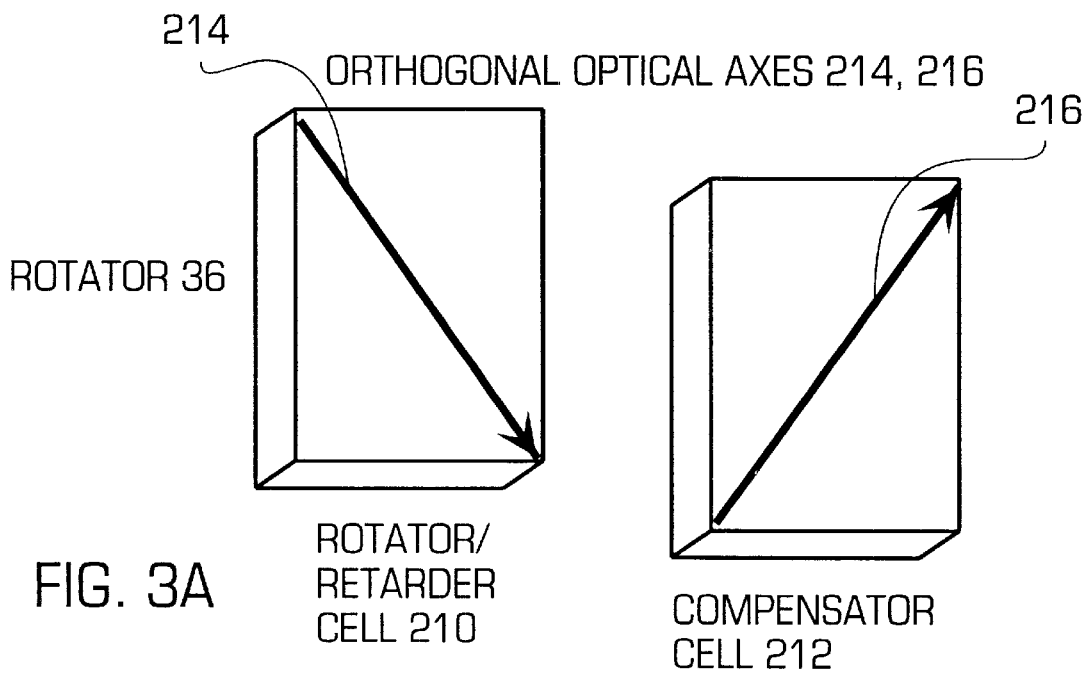
FIG. 3a illustrates the arrangement of the optical axes in a rotator/compensator pair.
Figure 3B:
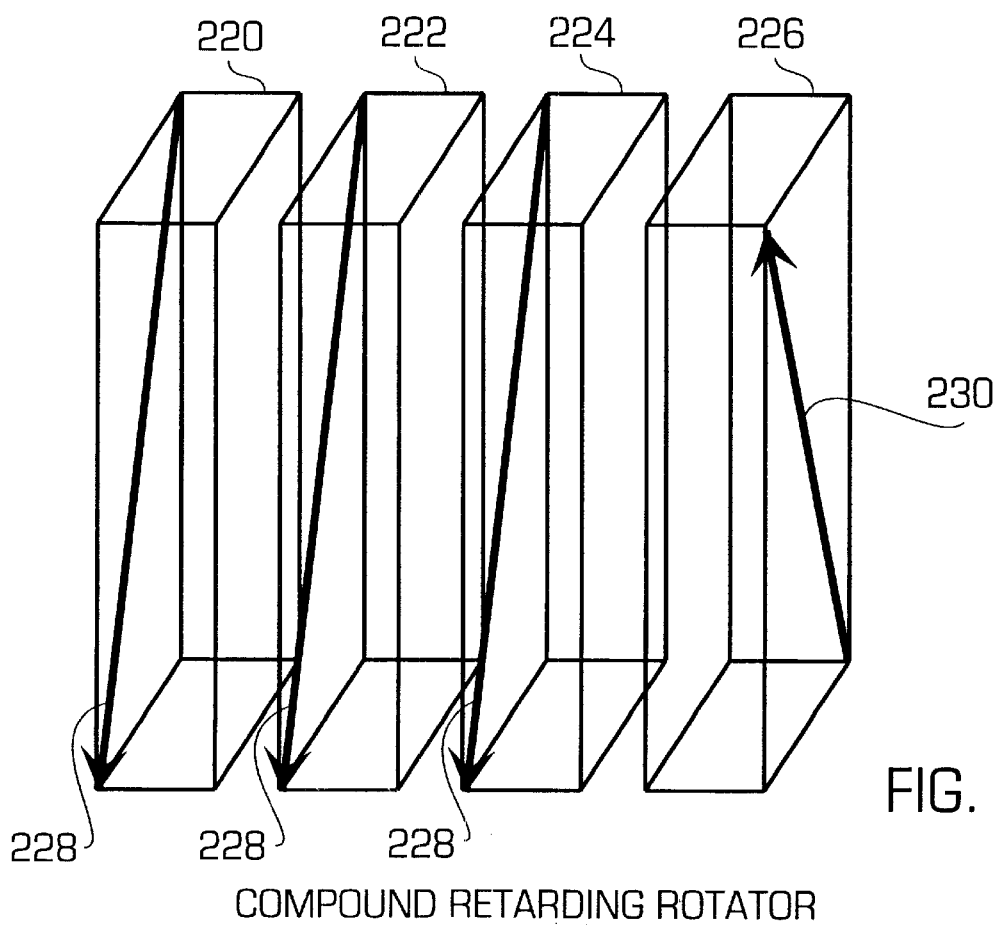
FIG. 3b illustrates the arrangement of the optical axes in a compound, zero-order retarding rotator in accordance with the invention.

FIGS. 3a and 3b illustrate a rotator 36 in accordance with the invention made up of a stack of cells. In more detail, FIG. 3a illustrates an example of a compound rotator 36 that may include a rotator/retarder cell 210 coupled together (stacked) with a compensator cell 212. In accordance with the invention, the optical axis 214 of the retarder 210 is at a 45° angle with respect to the incoming light polarization while the optical axis 216 of the compensator 212 is also at a 45° angle with respect to the incoming light polarization but rotated 90° with respect to the optical axis of the rotator as shown. The retarder/rotator cell 210 may rotate the polarization of the incoming light while the compensator may compensate for any excess over-rotation so that a 90° or 0° polarization rotation is achieved in accordance with the invention that permits the predetermined relationship between the polarizations of the first and second light paths to be maintained. As is well known, the crosstalk decreases the closer the signal is to 0° or 90° rotation. Thus, compensating for excess rotation results in a device with minimal crosstalk.

FIG. 3b illustrates a preferred embodiment of the compound rotator 36 in accordance with the invention that includes one or more rotators/retarders coupled to a one or more compensators. In particular, as shown in FIG. 3b, a first rotator cell 220, a second rotator cell 222, a third rotator cell 224, and a compensator cell 226 are stacked together. As described above, the stacked cells achieve a fast switching time, since each cell is independently controlled, while also achieving the necessary 90° or 0° rotation that normally requires a thicker, more slowly switching, rotator cell. The optical axes 228 of the rotators 220, 222, and 224 are at a 45° angle with respect to the incoming light polarization direction and parallel to one another as shown in FIG. 3b. The optical axis 230 of the compensator is also at a 45° angle with respect to incoming light polarization direction but rotated 90° with respect to the optical axes of the rotators as shown. In operation, the retarder/rotator cells have their optical axes aligned parallel to each other as shown in FIG. 3b, while a compensator cell has its optical axis perpendicular to the optical axes of the retarder cells. The compensator compensates for excess retardation caused by the retarder cells to achieve an accurate 90° or 0° rotation of the polarization in accordance with the invention.

The switching time can also be improved by applying a special driving waveform or by driving the liquid crystal cells at an elevated temperature. Switching time may also be improved by electrically causing partial retardation of each individual cell in the stack. For example, in a series of N retardation cells (wherein N may be one or more cells), each cell of the series must only achieve a retardation of the incoming light of 1/N of that required by a single cell since the N cells together have a total retardation of N just like the single cell. The time to switch the cell from one state to another, known as the decay time, t, decreases by $t/N^2$. The stacking of cells also permits the rotator to operate over a large temperature range. Thus, in the preferred embodiment, the rotator 36 comprises two or more retardation cells stacked with/coupled to a compensation cell as described above. Each of the rotator cells is individually driven as described above. The purpose of the multiplicity of independently driven cells is to obtain a faster switching response and to produce a slightly greater than π retardation between the on and off states within a certain operating voltage range. The retardation caused by the retardation cells in the rotator is then back-trimmed using the compensation cell to allow a change in retardation between the on and off states. The multiple driving voltages of the multiple cells permit an accurate change in retardation to be generated. The number of cells also reduce the relative operating voltage. In a preferred embodiment, the driving voltage, V, peak to peak, for each cell is 0<V<24 for a 1.2-kHz square wave. The typical crosstalk, CT, range for the rotator 36 in accordance with the invention is <−40 dB.

Figure 4A:
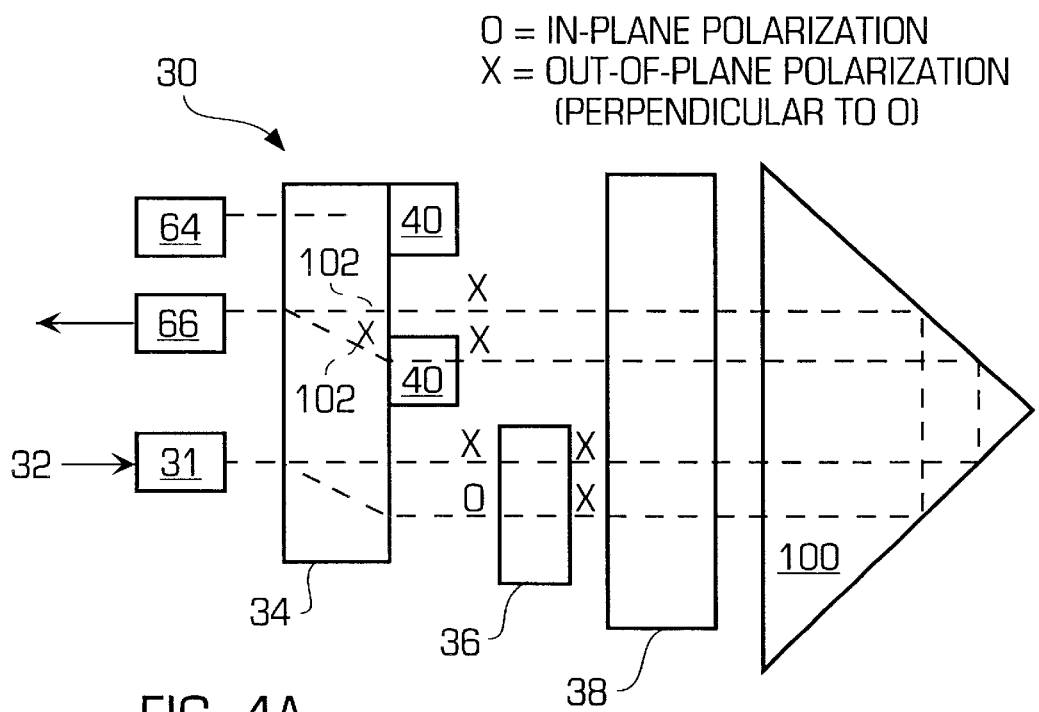
FIGS. 4a and 4b illustrate a 1×2 folded-path optical component in accordance with the invention.
Figure 4B:
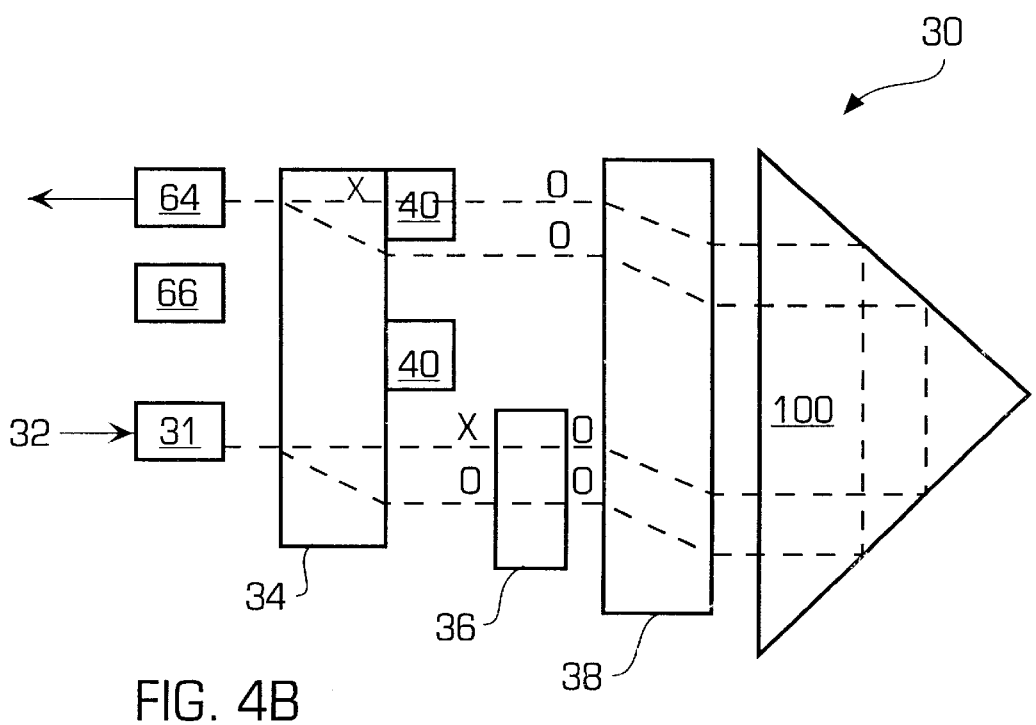

FIGS. 4a and 4b illustrate a 1×2 folded-path optical component 30 in accordance with the invention. In more detail, FIG. 4a illustrates the optical component when the incident light is directed to output port 66, while FIG. 4b illustrates the optical component when the incident light is directed to output port 64. As described above, this optical component 30 has similar components to the optical component 30 shown in FIGS. 1a and 1b, including the input and output collimators 31, 64, 66, the first birefringent element 34, the second birefringent element 38, the electrically controllable rotator 36, and the fixed waveplates 40. The function of these elements will not be described herein unless the function is different than described above. For example, the first birefringent element 34, in this embodiment, performs the functions of the first and third birefringent elements shown in FIGS. 1a and 1b, so that the third birefringent element may be eliminated in this embodiment. In addition to the common elements described above, this embodiment of the optical component also includes a retroreflector 100 that reflects incoming optical signals, as shown in FIGS. 4a and 54b. The operation of the folded-path 1×2 optical component will now be briefly described.

As shown in FIG. 4a, an incident light beam 32 from the input collimator 31 is directed to output port 66 in accordance with the invention. As shown, the incident light is split into two polarizations, an X polarization and an O polarization, as shown in FIGS. 4 and 5 by the first birefringent element 34. The two polarization signals pass through rotator 36 so that the output signals have the same polarization state as each other. Due to the polarization states of both signals, the signals pass through the second birefringent element 38 without the walkoff described in the discussion of FIGS. 1a and 1b. The signals then strike retroreflector 100 and reflect as shown. The reflected signals then pass back through the second birefringent element 38 and again do not walk off but remain colinear and parallel. The signals from the second birefringent element are then directed to the first birefringent element 34. In this case, the lower signal passes through the fixed waveplate 40 to change the polarization of that signal. Now, the two signals 102 have different polarizations, and therefore one of the signals (the signal that is rotated by the fixed waveplate) walks off toward the other signal so that the two signals are recombined and exit from output port 66, as shown. Since the optical component in accordance with the invention uses both of the polarizations of the incident light, the optical component does not have the typical high insertion losses. In FIG. 4b, the incident light signal 32 is eventually directed to output port 64 in a similar manner to that described above. In this case, the signals walk off as they pass through the second birefringent element 38. The operation of the optical component as shown in FIG. 4b will not be described in more detail, since it can be extrapolated easily from the discussion of FIG. 4a. A 1×4 folded-path optical component will now be described.

FIGS. 5a–d illustrate the operation of a 1×4 folded-path optical component 110 in accordance with the invention. An unfolded-path 1×4 optical component will not be described here, since its structure is very similar to the folded-path optical component and its operation is similar. Likewise, the unfolded-path 1×2 optical component 30 shown in FIGS. 1a and 1b and the folded-path optical component 30 shown in FIGS. 4a and 4b have similar structures with some minor changes (such as the retroreflector) and operate is a similar manner. FIGS. 5a–d illustrate the folded-path 1×4 optical component 110 receiving an incident signal 32 and outputting the signal to one of four output ports. To understand the operation of this embodiment, the structure shown in FIG. 5a will be described, along with the operation of that structure. The structures shown in FIGS. 5b–d and their operation will not be described, since they are similar.

FIG. 5a illustrates a 1×4 folded-path optical component 110 in accordance with the invention. The optical component may include various components from the 1×2 optical component, including the input collimator 31, the first and second output ports 64 and 66, the first, second, and third birefringent elements 34, 38, and 42, the fixed waveplates 40, the rotator element 36, and the retroreflector 100. In this embodiment, the first birefringent element 34 is a walkoff-up element that causes one of the polarizations to walk off upward from the other polarization, the second birefringent element 38 is a walkoff-lateral element that causes one polarization to walk off laterally away from the other polarization, the third birefringent element 42 is a walkoff-down element that causes one polarization to walk off downward from the other polarization, and the fourth birefringent element 116 comprises two birefringent elements with two different optical axes, as shown.

For purposes of illustration, FIGS. 5a–d include an illustration 112 of the end face of each particular element, the position of the signals at the end face of the element, and the polarization of the signals at the end face of the element. The end-face illustration 112 is not a hardware element in the optical component and merely illustrates the relative position of the signals and the polarization of those signals. As above, the different polarizations of the signals are represented by an X and an O. In addition to the elements set forth above, the optical component may also include a second controllable rotator element 114, a two-optical-axis birefringent element 116 having two separate crystals sandwiched together, and third and fourth output ports 118 and 120.

As shown in FIG. 5a, an incident beam 32 is received at input port 31 and output to output port 64. In more detail, the incident light exiting input port 31 has both polarizations as shown by the end-face illustration 112. The incident light enters the first birefringent element 34, and then, in general, one of the polarizations in the incident signal walks off, as shown by 112. The two different polarization signals pass through the electrically controlled rotator 36 (with the upper element activated in this embodiment) so that the polarization of only the bottom signal is changed and two signals with the same polarization are output. These signals are then passed through the second birefringent element 38, which walks off both signals laterally. The output signals are then fed into the second controllable rotator 114 (with neither element active in this embodiment) so that both signals are rotated to the other polarization (■ in this example).

Figure 5B:
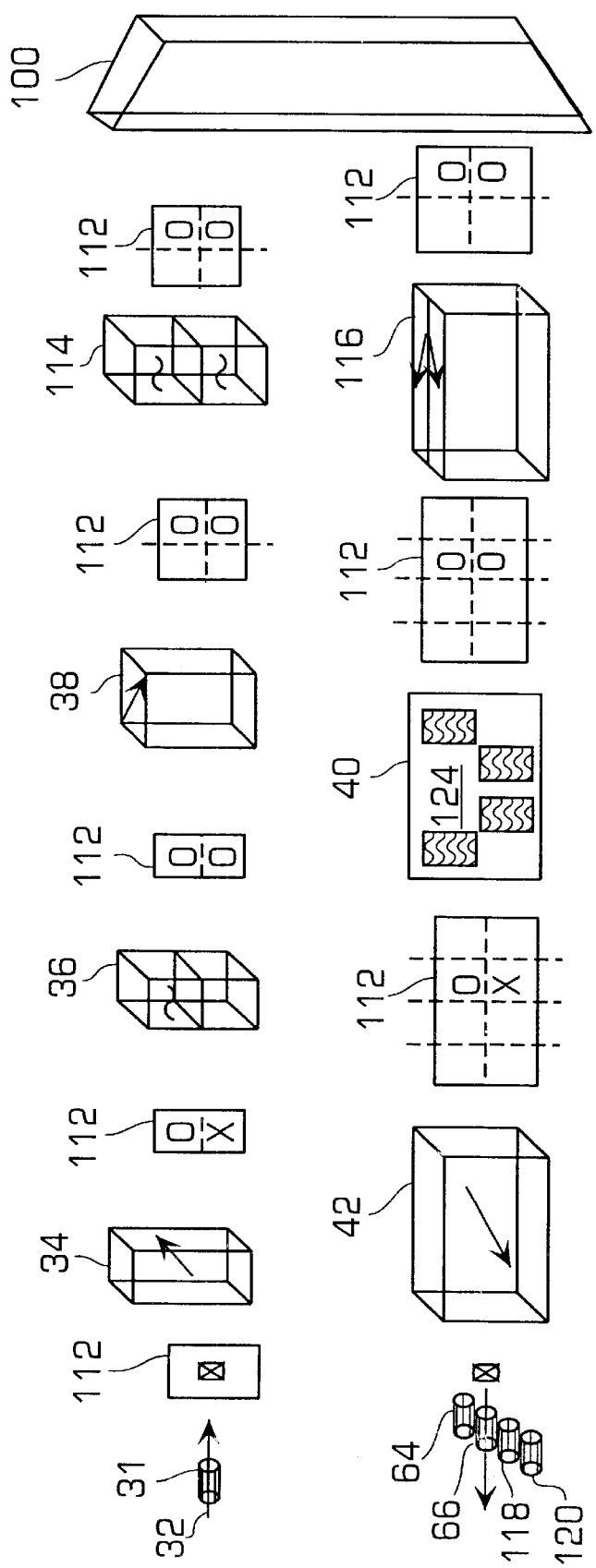
Figure 5C:
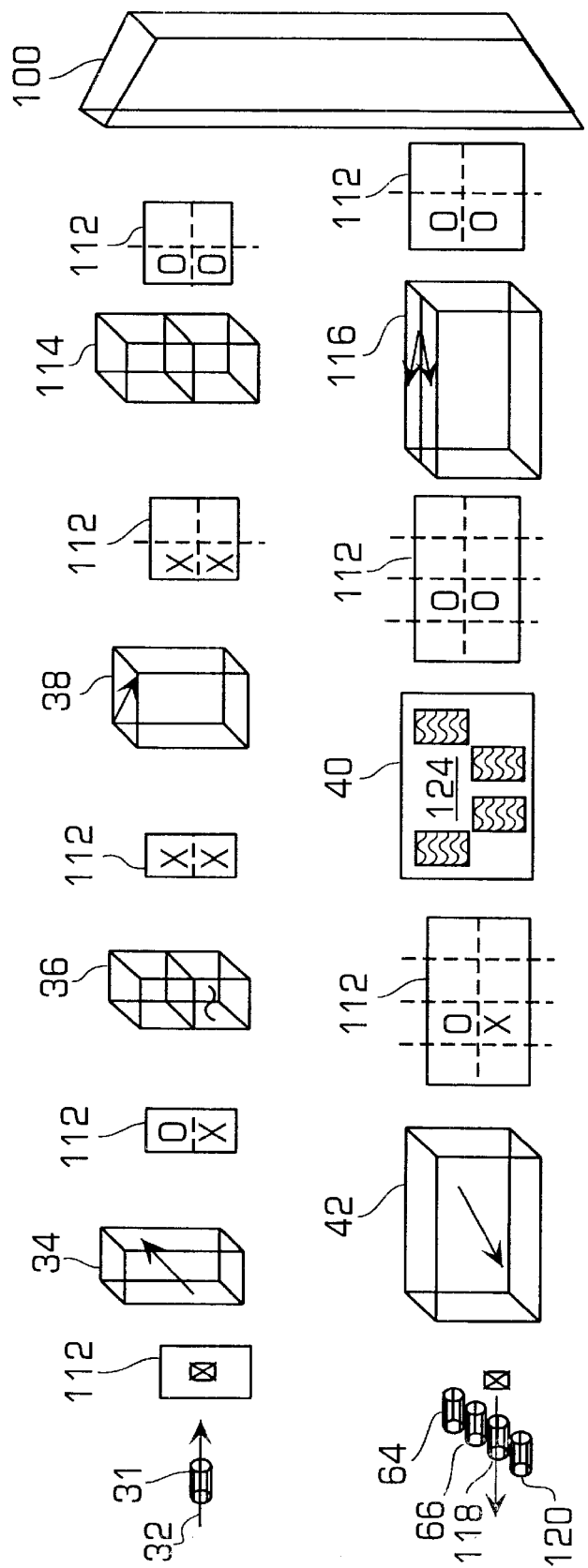
Figure 5D:
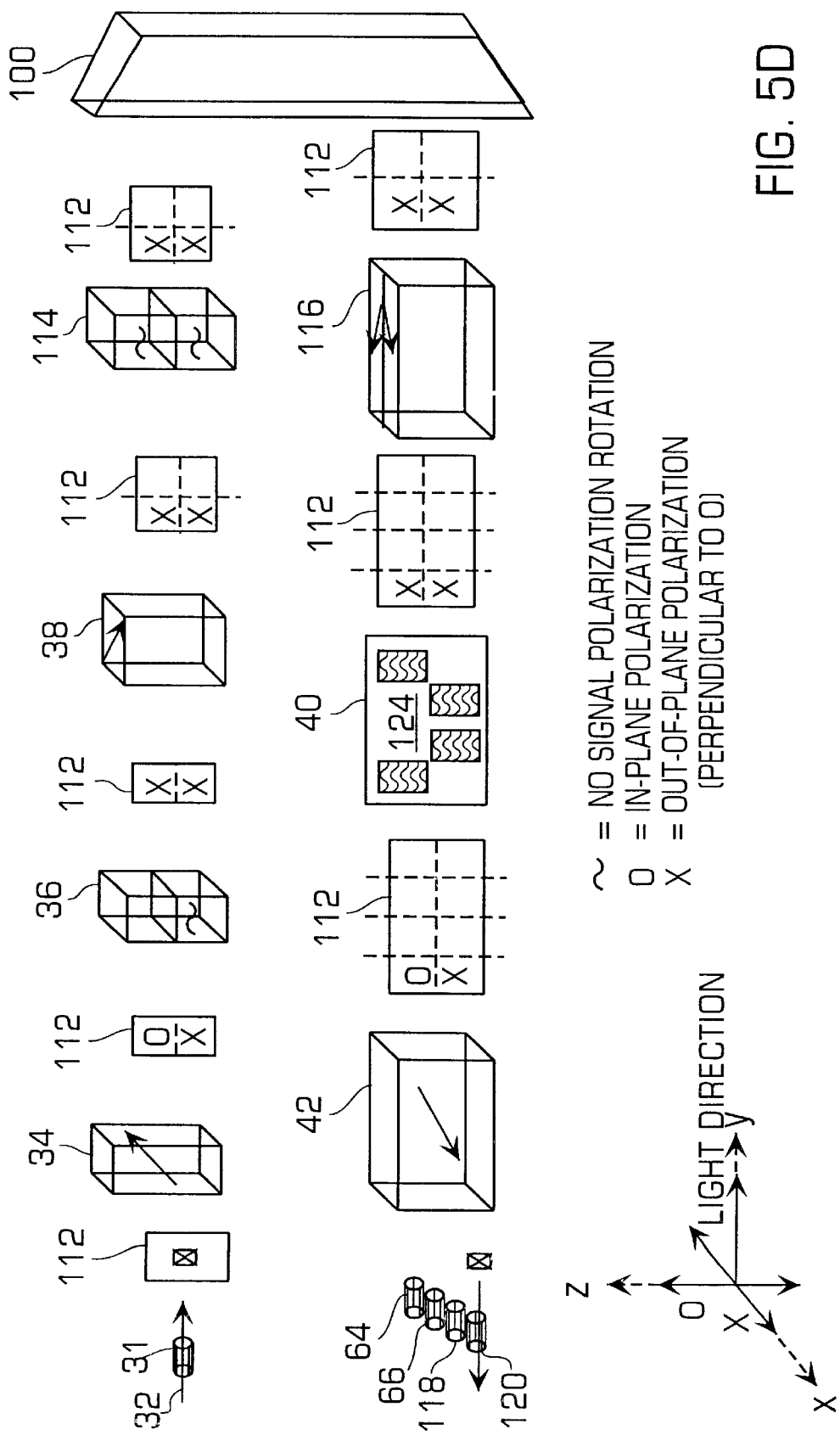

The signals are then fed into the retroreflector 100, which reflects the signals down to the fourth birefringent element 116, which may walk off the signals laterally under certain circumstances. In the device shown in FIGS. 5a and 5d, the birefringent element 116 does walk off the signals due to the particular polarization of the signals entering the birefringent element. However, in FIGS. 5b–c, the signals are not walked off by the fourth birefringent element 116. In FIGS. 5a–5d, the signal exit the proper output port. The signals then strike the half-wave plates 40. In this embodiment, an upper half-wave plate 122 may rotate the upper signal to an O polarization. As shown in FIG. 5a, the half-wave plate 40 may include one or more fixed half-wave plates 40 that rotate the polarization of one of the incoming signals so that a controllable rotator element is not necessary. The signals, now having different polarizations as shown in the end-face illustration 112, are then fed to the fifth birefringent element 42. This element walks off one of the signals so that the signals recombine and exit through output port 64, as shown. As described above, FIG. 5b illustrates an incident signal directed to a second output port 66; FIG. 5c illustrates an incident signal directed to a third output port 118, and FIG. 5d illustrates an incident signal directed to a fourth output port 120. In this manner, a light signal from a single input port may be directed to any one of four different output ports. In addition, the optical component in accordance with the invention may permit a percentage of the incident signal to be directed to each output port (i.e., attenuated).

Figure 6:
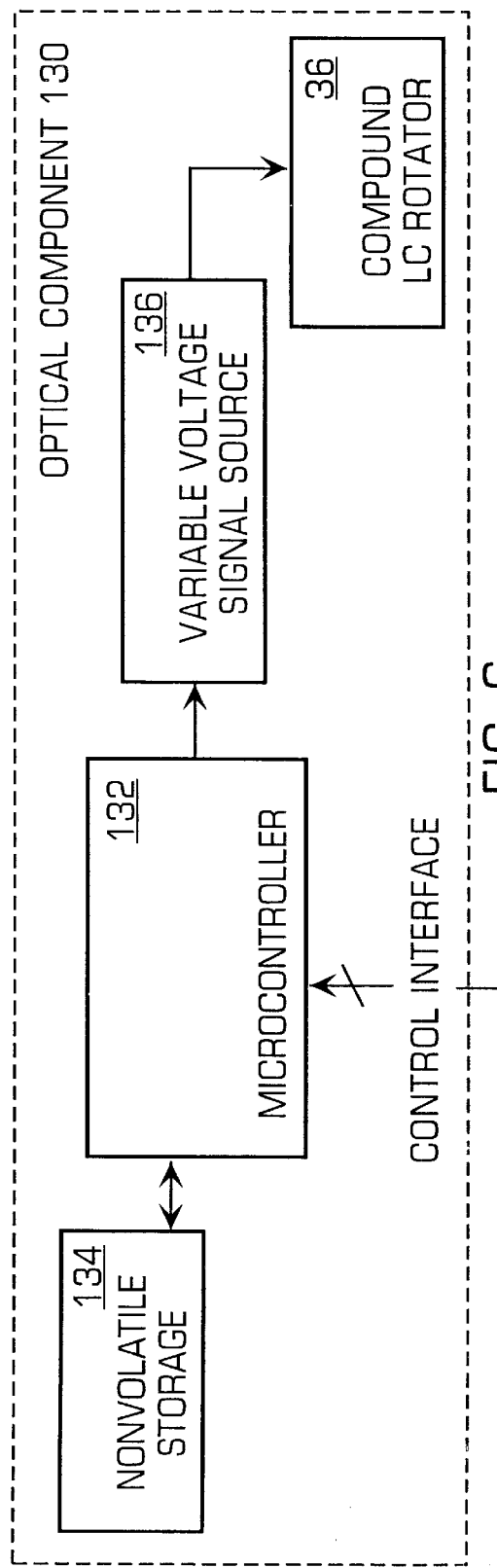
FIG. 6 illustrates a multifunctional optical component in accordance with the invention.

FIG. 6 illustrates a multifunctional optical component 130 in accordance with the invention. The rotator element 36 of the optical components described above may be controlled in a particular manner and integrated into the optical components of FIGS. 1a, 1b, 4a, 4b, and 5a–d to provide different optical functions, including attenuation, variable optical coupling/splitting, optical switching, polarization mode dispersion control, and the like.

The multifunctional optical component 130 may include a microcontroller or microprocessor 132, a nonvolatile storage device 134 such as a nonvolatile memory, a variable-voltage signal source 136, the rotator 36, and the other hardware elements of the optical components described above. To achieve different optical functions, the drive signal applied to the rotator 36 may be varied, based on the control signals from the control interface of the microcontroller, as shown in FIG. 6. In accordance with the invention, the drive signal applied to the rotator 36 may be varied over time in amplitude, frequency, or shape to achieve the different optical functions.

In particular, the user may select a particular optical function to perform, and a signal is transmitted over the control interface to the microcontroller 132. The microcontroller 132, based on the optical function selected by the user, may retrieve the appropriate set of drive signal characteristics from the nonvolatile storage 134. The microcontroller then passes this set of signals on to the variable-voltage signal source 136 that generates the drive signal that controls the rotator 36. In accordance with the invention, the set of drive signal characteristics stored in the nonvolatile storage 134 may be updated periodically. In order to update the set of drive signal characteristics, the nonvolatile memory storage may be a memory device that is nonvolatile and also updatable, such as an electrically erasable programmable read only memory (EEPROM). In this manner, the functions of the optical component in accordance with the invention may be varied without changing the hardware elements of the optical component.

Figure 7:
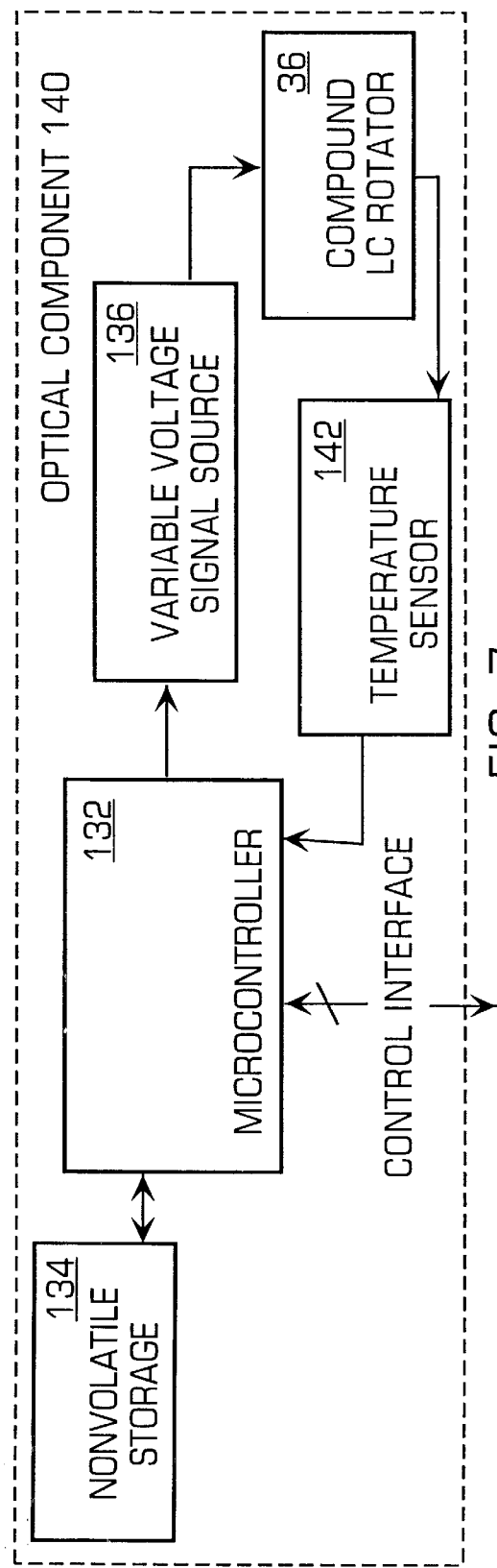
FIG. 7 illustrates a first embodiment of a temperature insensitive optical component in accordance with the invention.

FIG. 7 illustrates a first embodiment of a temperature-insensitive optical component 140 in accordance with the invention. As with the multifunctional optical component described above, this optical component may be integrated with the components shown in FIGS. 1a, 1b, 4a, 4b, and 5a–d to provide an optical device. In addition, the multi-functionality described above may be combined with the temperature insensitivity described herein to provide an optical device that is both multifunctional and temperature insensitive.

As shown in FIG. 7, the optical component may include the rotator 36, microcontroller 132, the nonvolatile storage 134 (possibly an updatable EEPROM), and the variable-voltage signal source 136 of the multifunctional optical component described above. In addition, the optical component 140 may include a temperature sensor 142. The elements shown in FIG. 7 may permit the rotator 36 to be electrically controlled. In more detail, to ensure that the optical component operates at peak performance regardless of its temperature, the drive signal applied to the rotator 36 may be varied based on the control signals from the temperature sensor. In accordance with the invention, the drive signal applied to the rotator 36 may be varied over time in amplitude, to compensate for temperature changes.

In more detail, the microcontroller may control the rotator 36 based on control signals fed to the microcontroller 132 over the control interface by the user of the optical component or from the temperature sensor 142. In particular, the user may select an operating temperature for the optical component, or the temperature sensor may determine the operating temperature of the optical component. The operating temperature of the optical component can be assessed periodically so that the optical component in accordance with the invention can adjust the drive signals continuously to account for changes in temperature that would ordinarily adversely affect its performance.

Depending on the current operating temperature of the optical component, the microcontroller may retrieve the appropriate set of drive signal characteristics from a temperature compensation lookup table in the nonvolatile storage 134. The microcontroller passes the appropriate set to the variable-voltage signal source 136 that generates the drive signal that controls the rotator 36. In accordance with the invention, the set of drive signal characteristics stored in the nonvolatile storage 134 may be updated periodically. In order to update the set of drive signal characteristics, the nonvolatile memory storage may be a memory device that is both nonvolatile and updatable, such as an electrically erasable programmable read only memory (EEPROM). In this manner, any changes in the operating temperature of the optical component may be compensated for automatically in accordance with the invention without changing the hardware elements of the optical component. In a preferred embodiment, only the voltage on the two pixels of the compensator cell are adjusted to achieve temperature insensitivity. We will now describe another embodiment of a temperature-insensitive optical component in accordance with the invention.

Figure 8:
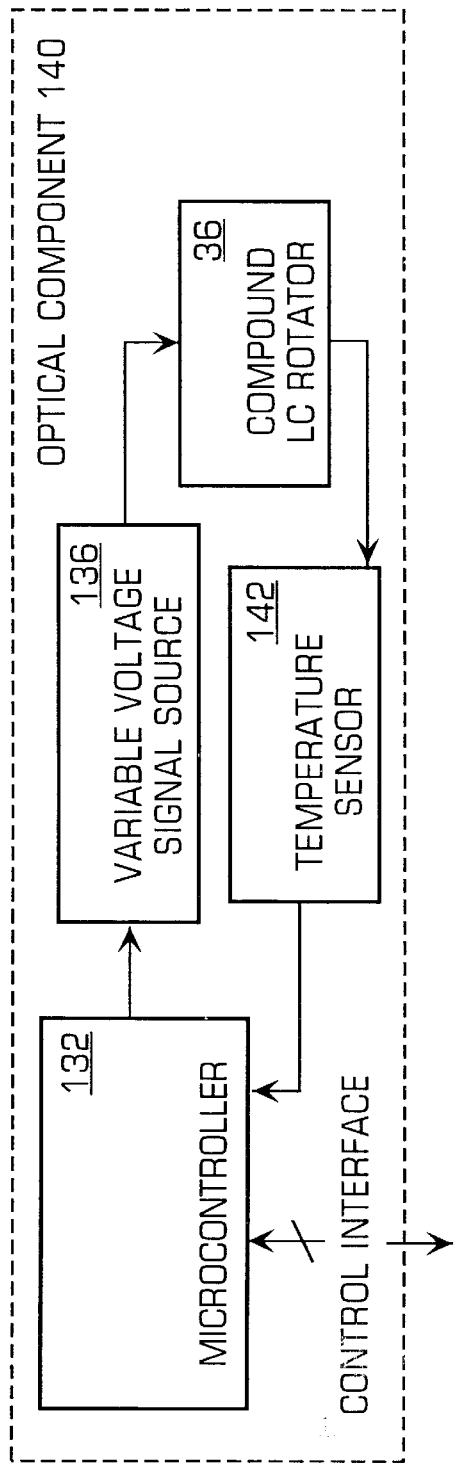
FIG. 8 illustrates a second embodiment of a temperature insensitive optical component in accordance with the invention.

FIG. 8 illustrates a second embodiment of a temperature-insensitive optical component 140 in accordance with the invention. This embodiment has the same elements as the first embodiment, except that the nonvolatile storage 134 is no longer necessary. In particular, a software module may be stored in the microcontroller 132 that implements an algorithm whereby the module outputs a drive signal in response to input of the current operating temperature of the optical component. In operation, the temperature sensor may periodically determine the current operating temperature of the optical component, the software module may determine the optimum drive signal for the current operating temperature, and the new optimum drive signal may be fed to the variable-voltage signal source. In accordance with the invention, the optical component may automatically compensate for temperature changes that would otherwise adversely affect its performance. The operation of the temperature compensation in accordance with the invention by controlling the voltages on the rotator elements will now be described.

Figure 9:
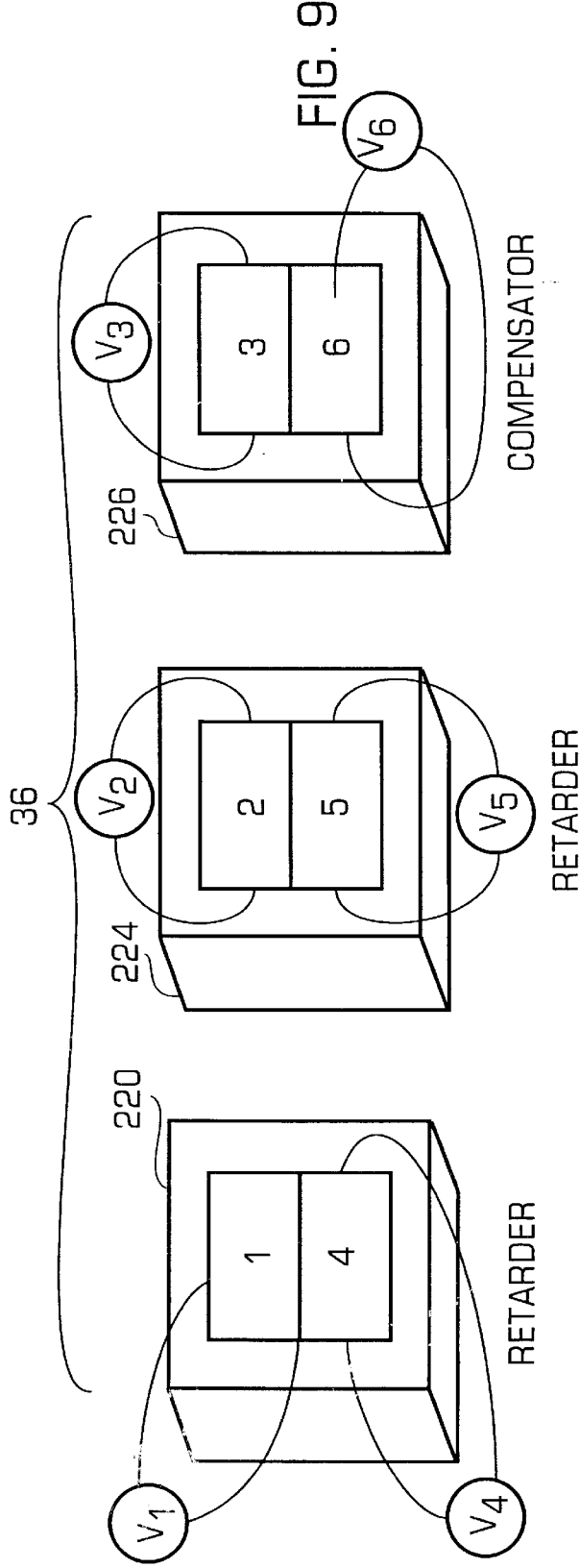
FIG. 9 is a diagram illustrating the multi-cell rotator in accordance with the invention including the multiple pixels.

FIG. 9 is a diagram illustrating the multicell rotator 36 in accordance with the invention including the one or more retarder cells 220, 224 and a compensator cell 226. In the preferred embodiment, two retarder cells and one compensator cells are used. As shown, each cell has two pixels that are used to independently control the polarization of the beams that pass through each pixel. As shown, the first retarder has two pixels (pixels 1 and 4 that are controlled by potentially different voltages V1 and V4), the second retarder has two pixels (pixels 2 and 5 that are controlled by potentially different voltages V2 and V5), and the compensator has two pixels (pixels 3 and 6 that are controlled by potentially different voltages V3 and V6). The voltages are potentially different in that each pixel is independently controllable so that each voltage to each pixel may be different.

In accordance with a preferred embodiment of the invention, the temperature compensation of the optical device may be accomplished by controlling only the voltages of the pixels of the compensator as shown in FIGS. 10 and 11. In particular, FIG. 10 is a diagram illustrating the preferred actual temperature compensation drive voltages for the compensator pixels (pixels 3 and 6), while FIG. 11 is a diagram illustrating the actual drive voltages for the other passive pixels (pixels 1,2, 4, and 5). FIGS. 10 and 11 show the voltages applied to each pixel for an output of light at the first output port (Port 1) and of light at the second output port (Port2). As shown in FIG. 11, since the temperature compensation is accomplished without controlling the retarder cells, the voltages applied to the pixels are similar (e.g., 1 volt or 23 volts), depending on the output port. These values shown in FIG. 11a are fixed regardless of the temperature of the optical device.

While the foregoing has been with reference to a particular embodiment of the invention, it will be appreciated by those skilled in the art that changes to this embodiment may be made without departing from the principles and spirit of the invention as defined by the set of appended claims.

What is claimed is:

1. A multifunctional optical device that controls the routing and characteristics of light signals carrying data from an optical fiber attached to the device, the device comprising:

a rotator that changes the polarization of the light from the optical fiber attached to the device;

a variable-voltage signal source for generating a drive signal to control the rotator;

a memory for storing one or more different sets of drive signals wherein each set of drive signals operate the rotator; and a controller for controlling the operation of the rotator by selecting a set of drive signals from the memory and applying the selected set of drive signals to the rotator, the optical device performing different functions depending on the set of drive signals selected by the controller, the functions of the device comprising at least a switching mode and an attenuation mode.

2. The device of claim 1, wherein the controller comprises microprocessor.

3. The device of claim 1, wherein the controller comprises microcontroller.

4. The device of claim 1 further comprising a control interface to permit a user to control the functions of the component.

5. The device of claim 1 further comprising means for updating set of drive signal characteristics for the different functions.

6. The device of claim 5, wherein the memory comprises a non-volatile memory device.

7. The device of claim 6, wherein the memory comprises an EEPROM.

8. The device of claim 7, wherein the memory comprises a table of drive signals.

9. The device of claim 8, wherein the one or more different functions selected by the sets of drive signal comprises a switching mode, an attenuation mode, a variable coupling mode, a polarization dependent loss (PDL) compensation mode, and a polarization mode dispersion (PMD) compensating mode.

10. The device of claim 1, wherein the different sets of drive signals further comprise one of drive signals having different shapes, drive signals having different amplitudes and drive signals having different frequencies.

11. A multifunction optical device, comprising:
- a first birefringent element for separating incoming light into first and second polarization signals;
- an electrically controlled rotator element for independently rotating the polarization of the first and second polarization signals to generate third and fourth signals having polarizations similar to each other;
- a second birefringent element for directing the third and fourth signals in predetermined directions based on the polarization of those signals to generate fifth and sixth signals;
- a fixed waveplate for rotating one of the fifth and sixth signals to generate seventh and eight signals having polarizations different from each other;
- a third birefringent element for combining the seventh and eight signals and directing the signals to one of a plurality of output ports; and
- wherein the rotator element further comprises a controller for controlling the operation of the rotator by selecting a set of drive signals and applying the selected set of drive signals to the rotator so that the optical device has different functions depending on the set of drive signals selected by the controller wherein the different functions comprise at least a switching mode and an attenuation mode.

12. The device of claim 11, wherein the set of drive signals further comprise a set of drive signals for operating the rotator element in a variable coupling mode, a set of drive signals for operating the rotator element in a polarization dispersion loss (PDL) compensating mode and a set of drive signals for operating the rotator element in a polarization mode dispersion (PMD) compensating mode.

13. The device of claim 12, wherein the rotator elements operates in two or more of the different modes.

14. The device of claim 11, wherein the controller further comprises an interface to provide different sets of drive signals to the memory to provide different device functions.

15. A multifunctional optical device, comprising:
- a rotator that changes the polarization of the light traveling through one or more light paths;
- a variable-voltage signal source for generating a drive signal to control the rotator;
- an EEPROM memory for storing one or more different sets of drive signal characteristics as a table of drive signals that change the operation of the rotator;
- a controller for controlling the operation of the rotator by selecting a set of drive signal characteristics, the optical device having different functions including a switching mode, an attenuation mode, a variable coupling mode and a polarization dispersion compensating mode depending on the set of drive signal characteristics selected by the controller; and
- the controller further comprising an interface to provide different sets of drive signals to the memory to provide different device functions.

* * * * *